United States Patent [19]
Kuretake et al.

[11] Patent Number: 5,358,270
[45] Date of Patent: Oct. 25, 1994

[54] AIR BAG DEVICE

[75] Inventors: Masato Kuretake; Kazuhiko Yamakawa; Motonobu Kitagawa; Sawayo Uda; Yoshimi Yoshida; Takayasu Zushi, all of Shiga, Japan

[73] Assignee: Takata Corporation, Tokyo, Japan

[21] Appl. No.: 93,897

[22] Filed: Jul. 20, 1993

[30] Foreign Application Priority Data

Aug. 31, 1992 [JP] Japan ................................ 4-231799

[51] Int. Cl.$^5$ ............................................. B60R 21/16
[52] U.S. Cl. ............................ 280/728 A; 280/728 R; 403/265; 403/269
[58] Field of Search .............. 280/728 R, 728 A, 731, 280/732; 403/265, 269, 270

[56] References Cited

U.S. PATENT DOCUMENTS

| 5,058,919 | 10/1991 | Paquette et al. | 280/732 |
| 5,125,683 | 6/1992 | Nakajima | 280/732 |
| 5,195,775 | 3/1993 | Komerska et al. | 280/732 |
| 5,217,254 | 6/1993 | Satoh | 280/732 |

FOREIGN PATENT DOCUMENTS

| 4040096 | 6/1991 | Fed. Rep. of Germany | 280/728 |
| 2520238 | 7/1983 | France | 280/728 |
| 3-79447 | 4/1991 | Japan | 280/728 A |
| 4-243645 | 8/1992 | Japan | 280/728 |
| 1531069 | 11/1978 | United Kingdom . | |
| 2251222 | 7/1992 | United Kingdom . | |

Primary Examiner—Eric D. Culbreth
Attorney, Agent, or Firm—Kanesaka & Takeuchi

[57] ABSTRACT

An air bag device for a driver seat is formed of a retainer composed of a main plate portion having an opening for mounting an inflator and mounting pieces extending uprightly from peripheral edges of the main plate portion, an air bag having a rear end connected to the retainer, an inflator mounted on the retainer, and a module cover for covering the air bag, the retainer being made of a synthetic resin, and the rear end of the air bag being secured to the retainer by embedding the rear end in the retainer. In an air bag for a passenger seat, a container for the air bag is made of a synthetic resin to secure the rear end of the air bag to the container.

10 Claims, 4 Drawing Sheets

AIR BAG DEVICE

FIELD OF THE INVENTION

This invention relates to air bag devices for a driver seat and a passenger seat, and more particularly to an air bag device whose retainer or container is made of a synthetic resin for purposes of reducing the weight thereof and enhancing the strength thereof.

DESCRIPTION OF THE RELATED ART

An air bag device for a driver seat comprises an air bag and an inflator (a gas generator) for extending the air bag, both of which are mounted on a retainer, and the air bag is covered with a module cover. An ordinary module cover is in the form of a box whose bottom portion is open, and its lower edge portion is fixed and secured to the retainer.

When the inflator is actuated to generate gas for extending the air bag, extremely high stress is applied to the retainer. The retainer is made of a metal such as iron so as to endure the high stress.

An air bag device for a passenger seat has an air bag and an inflator respectively mounted on a container. The air bag is contained in a folded condition in the container, and a front opening of the container is covered by a lid. When the air bag is extended, the container is subjected to an extremely high stress. Accordingly, the container is usually made of a metal such as iron so as to endure the stress.

Because the retainer or container made of iron is heavy, the weight of conventional air bag devices is hearty. Since the air bag device for a driver seat is usually mounted on the steering wheel, there is a problem such that the weight of the air bag device is too heavy, so that a stronger force is required to turn the steering wheel. Further, the retainers or containers made of iron require rust preventive treatments and are high in manufacturing costs.

OBJECTS AND SUMMARY OF THE INVENTION

The object of the present invention is to provide an air bag device which has a retainer or a container which is light in weight and does not form rust.

The air bag device as set forth in first and second aspects of the present invention relates to an air bag device for a driver seat comprising; a retainer composed of a main plate portion having an opening for mounting an inflator and mounting pieces extending uprightly from both sides of the main plate portion; an air bag and an inflator mounted on the retainer; and a module cover for covering the air bag.

The air bag device as set forth in a first aspect is characterized in that the retainer is made of a synthetic resin, and the air bag is directly fixed to secure the retainer by embedding the rear portion of the air bag in the retainer.

The air bag device as set forth in a second aspect is characterized in that the retainer is made of a synthetic resin, and the base end portions of cloth pieces for mounting the air bag are embedded and fixed in the retainer, and then the air bag is sewn to the cloth pieces.

The air bag device as set forth in third and fourth aspects of the present invention relates to an air bag device for a passenger seat, comprising; a vessel-like container having an opening at the front; an air bag mounted on and housed in folded condition in the container; an inflator mounted on the container so as to generate gas for extending the air bag; and a lid for covering the front opening of the container.

The air bag device a set forth in a third aspect is characterized in that the container is made of a synthetic resin, and the air bag is directly fixed and secured to the container by embedding the rear portion of the air bag in the container.

The air bag device as set forth in a fourth aspect is characterized in that the container is made of a synthetic resin, base end portions of cloth pieces for mounting the above-mentioned air bag are fixed and secured to the container by embedding the base end portions in the container, and the air bag is sewn to the cloth pieces using sewing yarns.

In the present invention, both of a thermosetting synthetic resin and a thermoplastic synthetic resin may be used as the synthetic resin.

The weight of the retainer and the container can be reduced by making them with synthetic resin. The strength of the retainer and the container can be enhanced to a sufficiently high level by using FRP (fibre reinforced plastic resin) as the synthetic resin, or by embedding meshes or punched metal in as required.

In the first and the third aspect, by embedding the rear portion of the air bag in the retainer and the container by such methods as insert-molding, the air bag can be fixed and secured strongly to the retainer and the container.

Further, in the second and fourth aspects, the base end portions of the cloth pieces for attaching the air bag is fixed and secured to the retainer or the container by embedding the base end portions of the cloth pieces in the retainer or container by insert-molding method, and the air bag is sewn to the cloth pieces. In this mounting structure, insert-molding can be conducted easily because the attached cloth on the air bag will be embedded in the retainer or the container beforehand.

PREFERRED EMBODIMENTS

Figure 1:
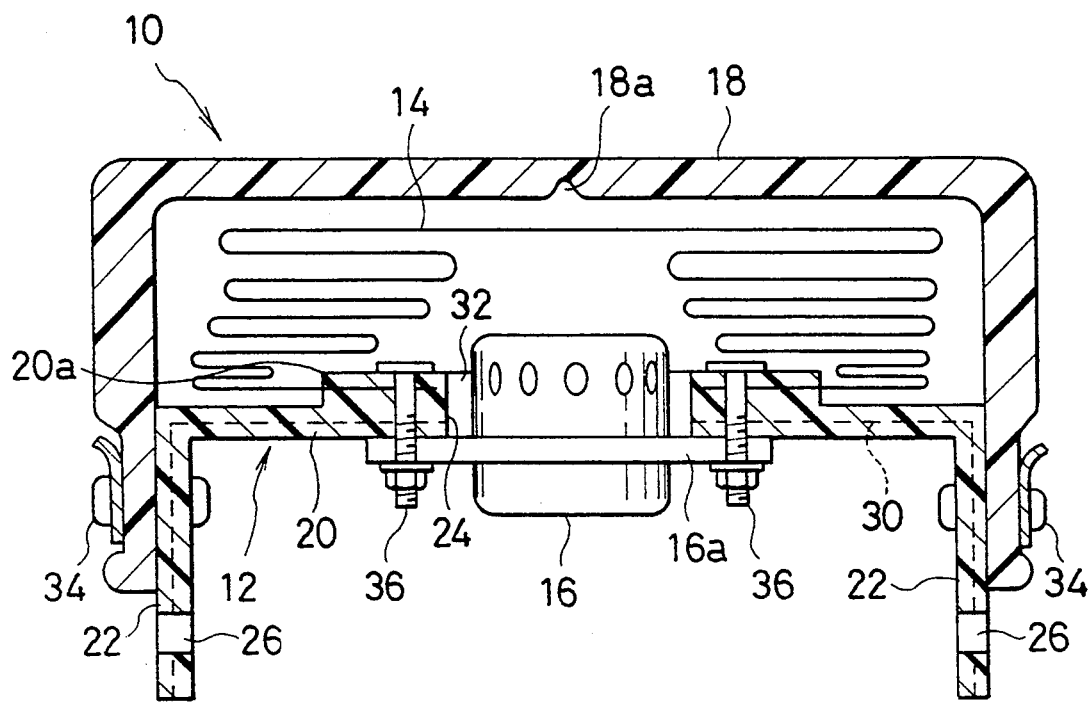
FIG. 1 is a sectional view of an air bag device for a driver seat according to one embodiment of the present invention.

The present invention will now be described below by way of examples with reference to the accompanying drawings. FIG. 1 is a sectional view showing a retainer of an air bag device for a driver seat according to one embodiment of the present invention.

This air bag device 10 for a driver seat is composed mainly of a retainer 12, an air bag 14, an inflator 16 and a module cover 18.

The retainer 12 comprises a rectangular main plate portion 20 and mounting pieces 22 extending uprightly from peripheral edges of the main plate portion 20. The main plate portion 20 has an opening 24 formed in the central part thereof for inserting the inflator 16 therein. Each of the mounting pieces 22 has a bolt insertion hole 26 formed therethrough for mounting the air, bag device onto a steering wheel of the vehicle.

The retainer 12 of this air bag device is made of a glass fiber reinforced synthetic resin. The main plate portion 20 and the mounting pieces 22 have reinforcing metallic meshes 30 embedded therein. A stepped portion 20a is formed in the peripheral edge portion of the opening 24 of the retainer 12.

The module cover 18 is made of a synthetic resin and is fixed and secured to the mounting pieces 22 of the retainer 12 by means of rivets 34. Reference numeral 18a denotes a line provided to tear open the module cover 18 when the air bag 14 is extended by a gas spouting from the inflator 16.

The air bag 14 has an opening 32 formed therein for receiving a head portion of the inflator 16. The peripheral edge portion of the opening 32 of the air bag is fixed and attached to the stepped portion 20a of the main plate portion 20 of the retainer 12 by embedding the peripheral edge portion in the stepped portion 20a by insert-molding.

The inflator 16 has a flange portion 16a fixedly secured to the retainer 12 by means of bolts 36.

The air bag device thus constructed is light in weight and does not form rust, because the retainer 12 is made of a synthetic resin. Further, the retainer 12 has a high strength, because it is reinforced by the meshes 30. In addition, since the peripheral edge portion of the opening 32 of the air bag 14 is embedded in the retainer 12 for fixing and securing purposes, rings and rivets for attaching the air bag to the retainer are not required, thereby rendering it possible to achieve a correspondent reduction in the weight thereof.

Figure 2:
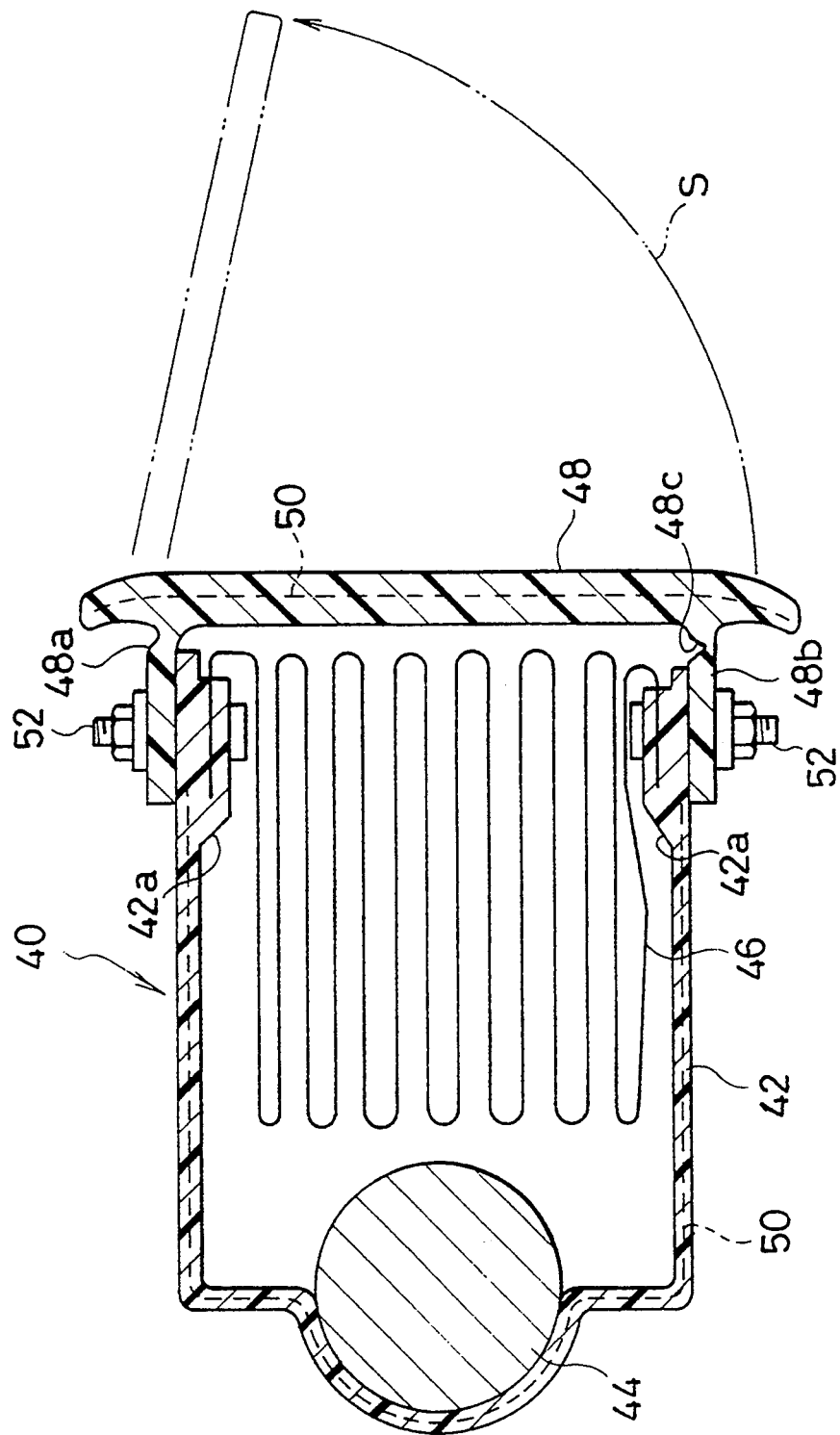
FIG. 2 is a sectional view of an air bag device for a passenger seat according to one embodiment of the present invention.

FIG. 2 is a sectional view of an air bag device 40 for a passenger seat according to one embodiment of the present invention. A container 42 in the form of a vessel whose front part is open and whose rear part is fitted with an inflator 44. An air bag 46 is housed in folded condition in the container 42. The front opening of the container 42 is covered with a lid 48.

The container 42 is made of a synthetic resin reinforced by meshes 50. The container 42 has a stepped portion 42a formed on and along the inner surface of the front opening. The end portion of the air bag 46 is fixed and attached to the stepped portion 42a by embedding the former in the latter by insert-molding. The lid 48 is also made of a synthetic resin and has mounting pieces 48a and 48b fixed and secured to the container 42 by means of bolts 52. The mounting piece 48b is provided with a tear line 48c so that when the air bag 46 is extended by a gas spouting from the inflator 44, the mounting piece 48b is torn to open along the tear line 48c, thereby opening the lid 48 as shown by arrow S.

This air bag device 40 is also made of a synthetic resin reinforced by the meshes 50, so that it is light in weight, does not get rusty, and has a high strength. Further, since the air bag 46 is fixed and secured to the container 42 by embedding the air bag 46 in the container by insert-molding, the weight of the device can be reduced by an amount corresponding to the weights of mounting bolts, screws and rivets.

Figure 3:
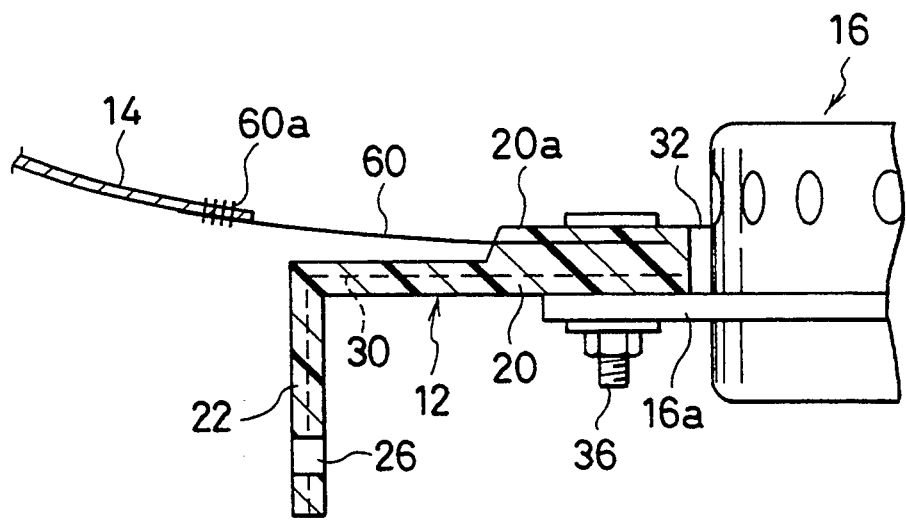
FIG. 3 is a sectional view of principal parts of an air bag device for a driver seat according to another embodiment of the present invention, wherein a cloth piece is embedded in a retainer.
Figure 4:
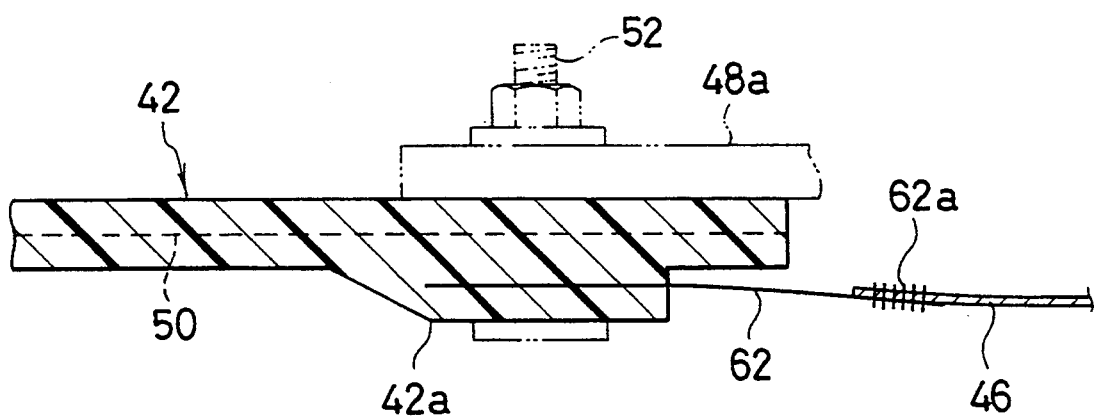
FIG. 4 is a sectional view of principal parts of an air bag device for a passenger seat according to another embodiment of the present invention, wherein a cloth piece is embedded in a retainer.

In FIG. 1 and 2, the ends of the air bags 14 and 46 are directly embedded in the retainer 12 or the container 42, respectively. In the present invention, as shown in FIGS. 3 and 4, it is possible to fix and attach end portions of cloth pieces 60 and 62 to the retainer 12 and the container 42, respectively by embedding the end portions in the retainer by insert-molding and sew the air bags 14 and 46 to the cloth pieces 60 and 62, respectively. Reference numbers 60a, 62a denote sewing yarns.

When inserting the cloth pieces 60 and 62, since the cloth tending to coil around the mold at the time of insert-molding is smaller than the air bag, insert-molding can be easily conducted.

If the sewn portion is located outside the retainer 12 as shown in FIG. 3, then the cloth piece 60 can be sewn easily to the air bag 14. Further, in case the sewn portion of the cloth piece 62 and the air bag 46 is located outside the container 42 as shown in FIG. 4, the cloth piece 62 can be sewn easily to the air bag 46.

Further, the cloth piece 60 is ring-shaped and located concentrically to the opening 32. The cloth piece 62 is in the form of a short cylinder, and is located along the inner periphery of the container 42.

While the cloth pieces 60 and 62 are shown as being smaller than the air bags 14 and 46 in FIG. 3 and 4, it is possible to use large cloth pieces to form the rear halves of the air bags.

Figure 5:
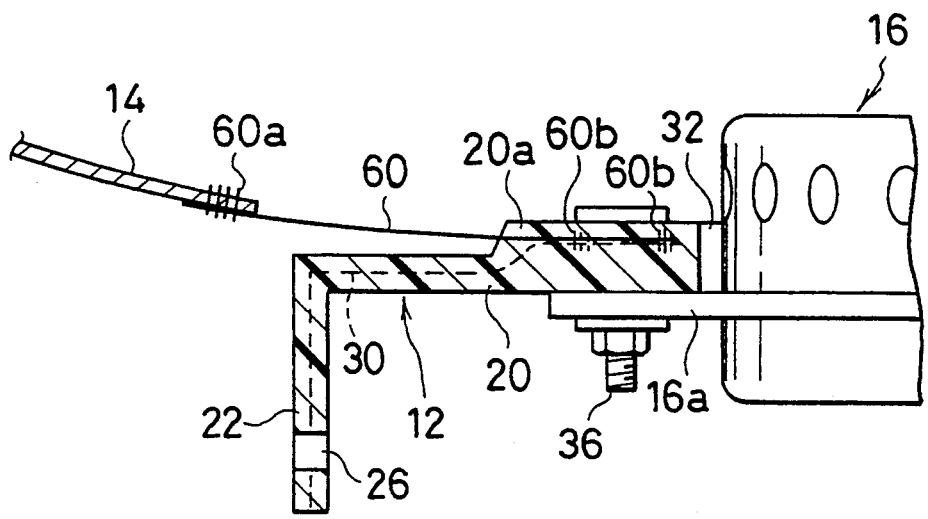
FIG. 5 is a sectional view of principal parts of an air bag device for a driver seat according to a further embodiment of the present invention.
Figure 6:
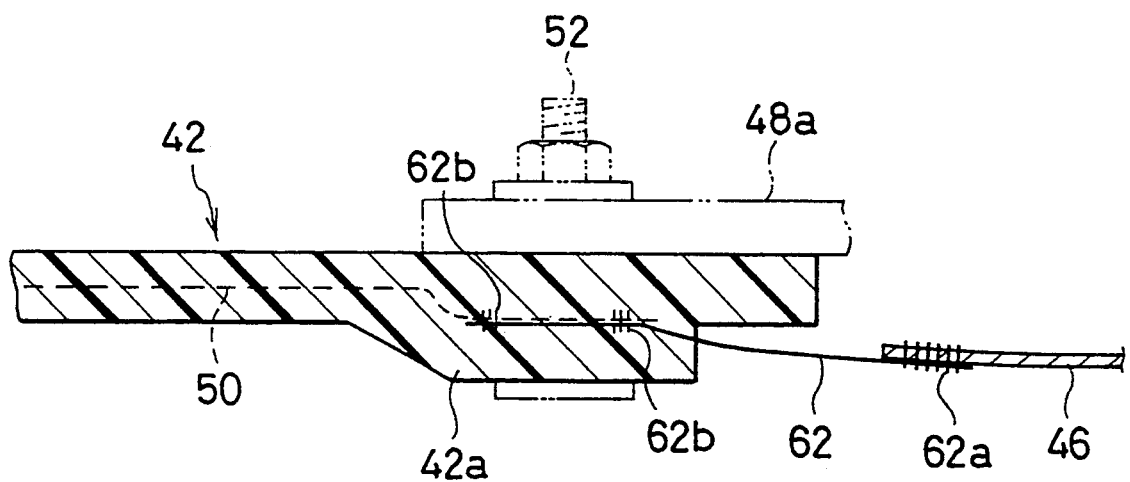
FIG. 6 is a sectional view of principal parts of an air bag device for a passenger seat according to a further embodiment of the present invention.

In the present invention, as shown in FIGS. 5 and 6 the meshes 30 and 50 for reinforcing the retainer and the container may be sewn to the cloth pieces 60 and 62. Therefore the air bags 14 and 46 can be fixed and attached to the retainer 12 and the container 42 in extremely secure fashion. Reference numerals 60b and 62b denote sewing yarns.

While in the above-mentioned embodiments, the retainer 12 and the container 42 are reinforced with the meshes 30, 50, reinforcement may be made using punching plates or higher-strength fibers such as long glass fibers, long carbon fibers or aromatic polyamide fibers. Further, it is possible to contain chopped strands of glass fibers or carbon fibers or the like in the synthetic resin.

As mentioned above, the air bag device of the present invention is extremely light in weight because the retainer or the container is made of a synthetic resin. Further, they do not form rust and have excellent durability. Further, the air bag can be fixed and attached strongly to the retainer or the container.

What is claimed is:

1. An air bag device for a driver seat, comprising;
a retainer composed of a main plate portion having an opening for mounting an inflator and mounting pieces extending uprightly from peripheral edges of the main plate portion, said retainer having a reinforcement material embedded therein,
an air bag having a rear end connected to said retainer,
an inflator mounted on said retainer, and a module cover for covering said air bag,
said retainer being made of a synthetic resin, and the rear end of said air bag being connected to the reinforcement material and secured to said retainer by embedding said rear end in said retainer.

2. An air bag device according to claim 1, wherein a portion surrounding said opening of said main plate portion of said retainer is thicker than other portion of the retainer, and the rear end of the air bag is embedded in the thick portion.

3. An air bag device for a driver seat, comprising;
a retainer made of a synthetic resin and composed of a main plate portion having an opening for mounting an inflator and mounting pieces extending uprightly from peripheral edges of the main plate portion, said retainer having a reinforcement material embedded therein,
an air bag having a rear end connected to said retainer,
an inflator mounted on said retainer,
a model cover for covering said air bag, and
a cloth piece having a base end which is connected to the reinforcement material and secured to the retainer by being embedded in said retainer, and
said rear end of said air bag being connected to said cloth piece.

4. An air bag device according to claim 3, wherein a leading end of said cloth piece is located outside the retainer when the air bag is extended.

5. An air bag device according to claim 3, wherein a portion surrounding said opening of said main plate portion of said retainer is thicker than other portion of the retainer, and the base end of said cloth piece is embedded in the thick portion.

6. An air bag device for a passenger seat, comprising;
a container which has an opening at a front part thereof and an edge around the opening, said container being integrally made of a synthetic resin as one member and having a reinforcement material embedded therein;
an air bag container in said container and having a rear end, said rear end being directly embedded in the edge of the container and securely connected to the reinforcement material;
an inflator mounted in said container; and
a lid for covering the front opening of said container.

7. An air bag device according to claim 6, wherein a portion of said container in which the rear end of said air bag is embedded is thicker than other portion of said container.

8. An air bag device for a passenger seat, comprising;
a container made of a synthetic resin which is opened at a front part thereof and a reinforcement material,
an air bag contained in said container,
an inflator mounted on said container,
a lid covering the front opening of said container,
a cloth piece having a rear end which is connected to the reinforcement material and secured to said container by being embedded in said container, and
a rear end of said air bag being connected to said cloth piece.

9. An air bag device according to claim 8, wherein a leading end of said cloth piece is located outside the container when the air bag is extended.

10. An air bag device according to claim 8, wherein a portion of said container in which the base end of said cloth piece is embedded is thicker than other portion of said container.

* * * * *